United States Patent [15] 3,674,861
Churchill [45] July 4, 1972

[54] LIVE ATTENUATED MAREK'S DISEASE VIRUS VACCINE FOR POULTRY

[72] Inventor: Anthony Edward Churchill, The Elms, Houghton, Huntingdon, England

[22] Filed: Oct. 31, 1969

[21] Appl. No.: 873,060

Related U.S. Application Data

[63] Continuation-in-part of Ser. No. 843,189, July 18, 1962, abandoned.

[30] Foreign Application Priority Data

Nov. 18, 1968 Great Britain ..................54,717/68

[52] U.S. Cl. ...............................424/89, 195/1.1, 195/1.3, 195/1.8
[51] Int. Cl. .....................................A61k 23/00, C12k 5/00
[58] Field of Search ...................................424/89; 195/1.1–1.8

[56] References Cited

OTHER PUBLICATIONS

Veterinary Bulletin 38: pp. 36, 104, 163– 164, 396– 397, 540, 706, 876– 877 (1968)
Churchill A. E. et al. Nature 215: 528– 530 July 29, 1967 " Agent of Marek' s Disease in Tissue Culture"
Solomon J. J. et al. P.S.E.B.M. 127: 173– 177 Jan. 1968 " Studies on the Etiology of Marek' s Disease I. Propagation of the Agent in Cell Culture."
Nazerian K. et al. P.S.E.B.M. 127: 177– 182 Jan. 1968 " Ibid II. Finding of a Herpesvirus in Cell Culture."
Avian Diseases 11: 694– 702(1967) " Report of the AAAP- Sponsored Leukosis Workshop"
Biggs Vet. Record 81: 583– 592 Dec. 1967 " Marek' s Disease"
Calnek Avian Diseases 12: 104– 129 Feb. 1968
Witter et al. Avian Diseases 12: 169– 185 Feb. 1968 " Preliminary Studies on Cell Cultures Infected with Marek' s Disease Agent"
Kottaridis et al. Avian Diseases 12: 246– 258 May 1968 " Marek' s Disease, II. Propagation of the Connecticut- A Isolate in Cell Cultures"
Chubb et al. Vet. Record 83: 4– 7 July 6, 1968 " Precipitating Antibodies Associated with Marek' s Disease"

*Primary Examiner*—Shep K. Rose
*Attorney*—Cushman, Darby & Cushman

[57] ABSTRACT

Marek's disease virus which causes a serious infection in poultry may be attenuated by serial passage in tissue culture. Passaging causes the loss of the A antigen after a certain number of passes while important protective antigens are retained. The virus may be attenuated in avian cells particularly those of the chick and duck, kidney cells and embryo fibroblasts being especially preferred. Usually about 20 to 40 passes are required. The live protective virus so obtained is cultivated further into a vaccine for parenteral administration.

17 Claims, No Drawings

LIVE ATTENUATED MAREK'S DISEASE VIRUS VACCINE FOR POULTRY

This invention relates to the production of antigenic materials and is particularly concerned with antigenic material useful in the preparation of vaccine intermediates and vaccines for the treatment or prevention of Marek's disease. This application is a continuation-in-part of U.S. Pat. application Ser. No. 843,189 filed 18th July 1969, now abandoned.

Marek's disease is a disease affecting poultry and constitutes one of the most serious infectious conditions of the chicken at the present time, affecting all classes of poultry stock including breeding and commercial egg producing stock and broilers. It is an infectious lymphoproliferative disease in which lymphoid tumors of the viscera are common and evidence is now available indicating that the cause of the disease is a virus or virus-like agent of the herpes group. Isolation of the virus in the cell-bound state has been achieved by the present inventor and his colleagues in tissue culture experiments in which chicken kidney cell monolayers are inoculated with kidney cells from diseased birds and incubated at 38.5°C. in a humified atmosphere of 5 percent carbon dioxide in air. From 7 – 10 days later, a virus-like cytopathic effect is observed, the cells showing intranuclear herpes-like particles which are strongly bound within the cells and not readily separable in an infective form. (See Nature 215 1967, 528 – 530).

It has now been discovered that during the passage of the virus in cell culture, certain characteristics of the virus are altered. Among the most important of the changes observed is a dramatic reduction in the pathogenicity of the virus after a certain number of passages. This loss of pathogenicity is thought to be associated with the loss of the A antigen from the virus or, alternatively, with the emergence and selection of a variant of the virus in which the A antigen is absent.

It has also been discovered that the A antigen-depleted virus that emerges during passage still possesses other antigenic components, and furthermore, that the retained antigens give rise to antibodies which confer on birds a very significant measure of protection against challenge with virulent virus either by inoculation of the infective agent or by transfer thereof from bird to bird as in the course of natural infection. These observations, of the development of an immunogenic form of an oncogenic virus i.e. a tumor causing virus, are quite unprecedented and lead to the possibility of producing, for the first time, a vaccine effective against such a virus.

In accordance with this invention, antigenic material is obtained by passaging a pathogenic Marek's disease virus in avian cells and continuing passaging until the virus has acquired a degree of non-pathogenicity suitable for the preparation of a live vaccine.

The attenuated form of the virus produced by passaging in accordance with the invention also possesses other desirable characteristics in addition to its protective properties. For example, the attenuated virus has proved to be remarkably stable in that it does not revert to the pathogenic state after inoculation into fowls. In addition, it provides protection not only against challenge with the pathogenic strain from which it was obtained but also against other strains of the virus, including especially acute strains. Moreover the attenuated virus shows little tendency to spread from inoculated birds into uninoculated birds in the same flock and this is an especially important advantage in the practical use of vaccines based on the live attenuated virus.

Another advantage of vaccines based on the attenuated virus is that they substantially reduce the incidence of other diseases of fowls, particularly coccidiosis. It is thought that this reduction is due to the general improvement in health brought about by the reduction in the incidence of Marek's disease.

The process of this invention may be applied to any strain of Marek's disease. Especially good results are obtained with the HPRS 16 strain of the virus and since this particular strain has been extensively investigated in previous research its use of the purposes of this invention is particularly recommended. However, various other strains of the virus are also encountered in the field and may be readily obtained from infected birds for the purposes of this invention. These other strains are of varying degrees of pathogenicity but as regards cultural characteristics and all other important properties are essentially of the same type as will appear from experiments described hereinafter. Thus two strains of virus, termed Frant strains, isolated from a flock of birds maintained free of certain specific pathogens, differ markedly in pathogenicity but are nevertheless capable of attenuation to produce a protective form of the virus. Other strains related to HPRS 16 are, for example, the HPRS 24 and HPRS B14 strains. Similarly, strains which are available in the United States of America known as the JM, GA, CAL-1, and CONN-A are also amenable to attenuation in accordance with this invention. In particular, the JM strain grows and produces a cytopathic effect similar to that of the HPRS and Frant strains and contains the same A, B and C antigens. As previously stated, the virus is difficult to isolate in quantity from cells without undergoing certain changes and it is therefore preferred to employ cell-associated virus as the inoculum and as the means for transferring the virus from one passage to the next.

Many species of avian cell may be used to carry out the attenuation process including, for example, chicken, duck, quail, pheasant and turkey cells, chicken cells being highly preferred. Where cell and tissue culture methods are employed, kidney cells or embryo fibroblasts have been found to be eminently successful as the host cells. For example, pathogenic virus isolated from tumors or other chicken tissues may be repeatedly passaged in cultures of chicken kidney cells until the required attenuation is obtained. This usually commences between the 20th and 30th passage and it is frequently found that after, for example, the 31st or the 39th passage the virus has acquired the appropriate properties for the production of a live attenuated vaccine. To ensure that a vaccine of the highest standard is obtained, the cells used for passaging are preferably initially free of the virus. Very encouraging results have been obtained where attenuation is in part achieved by passaging in one type of cell and completed by subsequent passes in a different type of avian cell. For example, the use of chick embryo fibroblasts has been found to be particularly advantageous and a preferred method of performing the attenuation process comprises passaging the virus first in chick kidney or other avian kidney cells followed by passaging in chick embryo fibroblasts. One of the most attractive procedures so far developed employs chick embryo fibroblasts for the majority of passages in the attenuation process. Thus the pathogenic virus may undergo from about 1 to about 6 passes, preferably 3 or 4 passes, in chick kidney cells in order to adapt the virus to the cell system followed by from about 15 to about 20 passes in the chick embryo fibroblasts. The employment of two types of cell system enables greater control to be exercised on the purity of the final product and the highly selective properties of the chick embryo fibroblasts for Marek's disease virus are particularly important in this connection. Also, chick fibroblasts are a particularly convenient type of cell to employ on a large scale.

The number of passages required to achieve the appropriate degree of attenuation may in general be determined readily by experiment. Thus the cultures may be tested at each stage for the presence of the A antigen by means of the well known Ochterlony gel diffusion test (Chubb and Churchill Vet. Rec. 1963, 83, 4). It will be appreciated that the number of passages depends to some extent on the degree of pathogenicity of the original strain selected. Usually it is unnecessary to exceed about 30 or in some cases about 40 passages and it is frequently possible to employ a number of passages significantly lower than this especially in the preferred two stage method referred to above.

Cultivation of the virus in avian cells may be achieved employing a wide variety of nutrient media and very satisfactory results have been obtained with a number of standard media and modifications of these. For example, Earle's balanced salt/lactalbumen hydrolysate (Medium No. 1, see Example 1) has been used with advantage. Good results have also been obtained, particularly with chick embryo fibroblast primary cultures, with the use of Medium No. 2 consisting of SM 199 (84 percent), tryptose phosphate broth (30 g/l, 5 percent), calf serum (5 percent) and penicillin/streptomycin (as in Medium No. 1). The composition of SM 199 is given by Morgan et al, Proc. Soc. Exp. Biol. Med. 73, 1 (1950). A modification (Medium No. 3) of Medium No. 2 in which SM 199 is replaced by Eagle's medium of enhanced vitamin and aminoacid content (Macpherson et al, Virology 16, 147 (1962)) may also be used. A further modification (Medium No. 4) of Medium No. 2 is possible in which Hank's salts are used in replacement of Earle's salts.

It will be appreciated that the process of this invention leads to the production of antigenic material in the form of an antigenic but non-pathogenic form of Marek's disease virus, or, more specifically, to a protective A antigen-free strain of the virus. More particularly the antigenic material comprises avian cells containing cell-associated attenuated virus. Such material is useful as a seed material in the production of a vaccine and is embraced per se within the scope of the present invention. One particular class of such material comprises chicken cells containing an attenuated form of the HPRS 16 strain of the virus, and a culture of chicken kidney cells containing attenuated virus has been deposited with the collection of veterinary viruses held by the Central Veterinary Laboratory, Weybridge, Surrey, where it is identified by the code number LEU/16/AT.

In order to produce a vaccine the attenuated virus obtained as described above may be further cultivated in the same cell system as used for the attenuation process or in related systems. Thus, if desired, the virus may be transferred from one cell system to another in a later stage of the process. For example, the attenuation and multiplication of the virus may be carried out in cultured cells and the virus may then be transferred to the bloodstream of intact birds and a vaccine obtained by recovering the blood of the animals. Chick embryo liver and lung cells may also be used.

Vaccines produced in accordance with this invention may be administered in various ways, e.g. by subcutaneous, intramuscular, intranasal, or intraocular injection into the young chick or into the embryo. Intramuscular injection into the leg is a particularly preferred route of administration.

The invention is illustrated in the following Examples.

EXAMPLE 1

Preparation of Cell Culture:

The kidneys were dissected from one to eight week old chicks immediately after death, and finely chopped with scissors and washed three times by agitation in 20 ml. phosphate buffered saline (PBS) (pH 7.2), followed by decantation. The cells were dispersed by trypsinization 20 ml. of 0.05 percent trypsin (Difco 1:250 trypsin) in PBS being added to the chopped kidney in a conical flask. Four, five minute, cycles of trypsinization were allowed, using fresh trypsin for each cycle and a magnetic stirrer. The cell suspension obtained from each trypsinizing cycle was added to 1.0 ml. of calf serum to inhibit the trypsin, and then subjected to 5 minutes centrifugation at 1,000 r.p.m. on an MSE Minor centrifuge to deposit the cells. The cell pellett was resuspended in cell culture growth medium (Medium No. 1) and the cells counted, using a haemocytometer. This cell suspension was diluted to contain $2 \times 10^6$ cells per 5.0 ml. in growth medium.

Medium No. 1

| Earle's balanced salt solution | 84% |
|---|---|
| Tryptose phosphate broth (30 g/liter) | 5% |
| Lactalbumen hydrolysate (50 g/liter) | 5% |
| Calf serum (heat-inactivated) | 5% |
| Penicillin (20,000 Us/ML.) } | 1% |
| Streptomycin (20 mg/ml.) } | |

$2 \times 10^6$ Cells in 5.0 ml. growth medium were added to each culture vessel (Falcon plastic petri-dishes — 50 mm). Cell cultures were incubated at 37°–38.5°C. in a humidified atmosphere of 5 percent $CO_2$. When the monolayers were confluent, usually after 3 days incubation, the medium was changed for maintenance medium. The composition of this was the same as that given for growth medium except that the tryptose phosphate broth and the calf serum were each reduced to 2% of the total volume. Monolayers were infected on the day that they became confluent after the maintenance medium had been added.

Virus Isolation from Infected Chickens:

For this purpose the 25th chick passage of the HPRS–16 strain of Acute Marek's disease has been found satisfactory.

Ovarian lymphoid tumors were forced through a 2-inch square sterile stainless-steel gauze (gauge 978) over a petri-dish by manual pressure using a sterile spatula. The tissue passing through was suspended in PBS by being vigorously pipetted. After standing on the bench for 2 minutes in a glass container to allow the larger pieces of tissue to sediment, the supernatant cell suspension was separated and centrifuged at 1,000 r.p.m. for 10 minutes in an MSE Minor centrifuge. The cell deposit was then resuspended in a convenient volume of cell culture growth medium. The resulting suspension was next passed through a 150 gauge stainless-steel gauze in a microfilter syringe. The filtrate should consist mainly of single tumor cells. These cells were counted in a haemocytometer and the cell concentration adjusted to about $10 \times 10^6$ cells per 1.0 ml. 0.5 ml. of this cell suspension was then inoculated on to each 3 day old confluent chicken kidney monolayer. In this primary isolation passage, the cultures were incubated for a further 10 to 14 days with medium changes at 3 day intervals.

Virus Passage:

When the cytopathic effect of the virus was well developed in the cells they were removed from the surface on which they were growing by dispersion with 0.05 percent trypsin in versene (EDTA). The suspended cells were spun out of the trypsin-versene mixture, resuspended in medium and used to infect fresh confluent monolayers. Owing to the fact that the virus was cell-associated, the increase in cytopathic effect from passage to passage was slow. Therefore, in the early passages the number of vessels used may be no more than doubled at each passage, but at later passages this may be improved to a four times or eight times increase in the number of cultures.

Characteristics of Attenuated Virus:

Virus continuously passaged in chicken kidney cell culture became attenuated after five to six months. Attenuated virus produced an increased rate of development of cytopathic effect such that the period between each passage was reduced from 7 days to 3 days. The attenuated virus produced macroscopic plaques 1.0 – 1.5 mm across, in chicken kidney monolayers in 6 to 7 days. In heavily infected cultures there was no antigen detectable by the Octerlony technique released into the culture medium, whereas in the case of nonattenuated virus, such an antigen was released. It was necessary to concentrate the medium from infected cultures up to 50 times by extraction of water or by precipitation of the antigens with ammonium sulphate to demonstrate the absence of this antigen satisfactorily.

The attenuated virus did not induce clinical Marek's disease when administered to one day old chicks of a susceptible strain (e.g. HPRS–RIR strain) by the intravenous or intra-abdominal route in the form of an infected chicken kidney cell suspension.

Production of Experimental Vaccine:

Seed virus in the form of frozen infected chicken kidney cells stored in 7.5 percent Dimethyl sulphoxide (DMSO) in a liquid nitrogen refrigerator was rapidly thawed and used to inoculate confluent chicken kidney monolayers. A dose of about $10^3$ plaque forming units was satisfactory for each 50 mm petri-dish. These cultures were then passaged at suitable intervals (e.g. 3 – 6 days) according to the efficiency with which the cytopathic effect developed. The cells from each infected culture were used to infect 2 to 8 fresh cultures according to the level of cytopathic effect. After 6 – 10 such passages, determined according to the quantity of vaccine required, the harvested infected chicken kidney cell suspension were dispensed into ampoules and stored in 7.5 percent DMSO in a liquid nitrogen refrigerator. An estimate of the content of infected cells in each container was made by a plaque assay on chicken kidney monolayers.

Dose:

A suitable dilution of the stored vaccine was computed such that each chick to be vaccinated received a dose of from about $5 \times 10^2$ to about $7 \times 10^3$ plaque forming units. A suitable diluent was physiological saline buffered at pH 7.2.

Route of Administration:

Inoculation was carried out immediately after dilution of the vaccine. The vaccine was given by the intra-abdominal (intra-peritoneal) route in a volume from 0.2 to 1.0 ml, e.g. 0.5 ml. per chick.

Large Scale Production:

The virus was grown in quantity using chicken kidney monolayers grown in Roux flasks or Thompson bottles. To produce monolayer cultures in these vessels, Roux flasks were seeded with $40 \times 10^6$ freshly trypsinised chicken kidney cells in 100 ml. growth medium and Thompson bottles with $80 \times 10^6$ cells in 200 ml. In this case, the same growth and maintenance media given previously were used except that Earle's Balanced Salt Solution was replaced by Hank's Balanced Salt Solution. Virus was passaged through a sufficient number of passages usually not exceeding 10, and harvested when a sufficient number of cultures for the vaccine batch required showed cytopathic effects involving more than 10 percent of the cell sheet.

Storage of Vaccine:

Harvested infected cells were removed from the trypsin and versene mixture by centrifugation as previously described. The cells were then resuspended in growth medium containing 10 percent calf serum and 7.5 percent Dimethyl sulphoxide. The cell concentration was adjusted to about $4 \times 10^6$ cells per 1.0 ml, and the cell suspension dispensed into ampoules which were then sealed. The cooling rate from +4°C. to –40°C. was controlled at a rate of 1°C. per minute. After –40°C. the ampoules were transferred rapidly to the liquid nitrogen refrigerator.

Tests for Immunogenicity in Chickens:

It has been found that 500 – 7,000 plaque forming units inoculated into chicks at one day old or two weeks old produces no untoward effect in a 20 week observation period. Subsequent challenge by contact with virulent virus 3 to 4 weeks after vaccination has demonstrated solid protection in those vaccinated as against 50 percent or higher mortality in the unvaccinated challenged controls.

In order to provide a routine test of the immunogenicity of vaccine batches, 20 one-day old chicks should be inoculated intra-abdominally with vaccine while another 20 are held in separate isolation accommodation as unvaccinated controls. Four weeks later, both vaccinated and control chicks are challenged by inoculation with cells containing virulent virus.

Test for Spreading:

A group of vaccinated HPRS RIR birds were left in direct contact with a group of susceptible birds and in indirect contact with a second group of susceptible birds of the same strain for 18 weeks. All groups were bled at 9 weeks, 11 weeks and 18 weeks and sera tested for antibody. At 18 weeks after vaccination all birds were bled and the buffy coats of their blood were tested for the presence of vaccine virus. The following table shows the results obtained:

| Tests for Spreading | Vaccinated | Direct Contact | Indirect Contact |
|---|---|---|---|
| Number of Birds | 15 | 8 | 14 |
| Antibody + at 11 and 18 weeks | 7 | 0 | 0 |
| Virus isolated | 4 | 0 | 0 |

Test for Stability:

The attenuated HPRS 16 strain was tested for stability by isolating the virus from the blood of 7 viraemic chickens, 15 weeks after inoculation at one day of age with HPRS 16, 39th passage. The buffy coat from these 8 blood samples was cooled and inoculated into 15 one day old HPRS–RIR chickens. During an 18 weeks observation period these birds remained clinically normal. Virus isolated from the circulation of two of these chicks showed the characteristic absence of the A antigen of attenuated virus.

EXAMPLE 2

Isolation and attenuation:

A strain of Marek's disease virus of low natural pathogenicity was isolated from kidneys of 4 week old chickens of a 'Specific Pathogen Free' breeding flock maintained in isolation and freedom from antibody to leucocis, avian encephalomyelitis, infectious bronchitis, Newcastle disease, infectious laryngotracheitis, CELO and GAL viruses, *Mycoplasma gallisepticum* and *S. pullorum*.

The kidneys were trypsinized and grown in the Earle's — lactalbumen medium, as described in Example 1. Cytopathic effect, typical of Marek's disease microplaques, was observed microscopically. The virus was then passaged 12 times in chicken kidney cell cultures on Medium No. 3, 12 times in chicken embryo fibroblast on Medium No. 3, and further 12 times in duck embryo fibroblast cultures on Medium No. 3. The virus strain so obtained was tested by gel diffusion and was shown to have lost its "A" antigen.

Tests for pathogenicity:

a. 50 (one day old) 'Sykes Line 50' genetically susceptible chickens, possessing maternal antibody, were inoculated with $10^{4.5}$ plaque forming units (pfu) of the attenuated Frant Strain per bird intra-muscularly. These animals showed no clinical symptoms for eleven months. They laid fertile eggs, of which over 100 were hatched and the chickens kept and observed for signs of the disease. Histological specimens of seven birds of the inoculated group were shown to be free of the lesions of Marek's disease.

b. Similar experiments using 20 'Sykes Line 50' chickens (day old), having maternal antibody, were carried out by inoculating the birds with $10^3$ pfu doses and similar results were obtained.

c. A group of genetically susceptible HPRS 'Rhode Island Red Chickens', having maternal antibody, were inoculated with $10^4$ pfu doses per bird. These birds were found to be clinically normal 12 weeks after inoculation.

d. Four groups of 10 Brown Leghorn chickens, free of antibody, were inoculated with approximately $10^4$ pfu dosages per bird. They remained clinically normal for six weeks, were sacrificed, and showed no macroscopic lesions.

Tests for immunogenicity:

a. A group of day-old 'Sykes Line 50' chickens was inoculated as follows: 27 with $10^4$ pfu of the 36th passage of the virus per bird, 10 days later, the inoculated group together with two control groups of 27 and 25 birds, respectively, were challenged by inoculation with a dosage of 150 pfu of the 7th passage level of the HPRS 16 strain per bird. The mortalities observed six months later were as follows:

| Group | Inoculated | Control | Control |
|---|---|---|---|
| Number of birds | 27 | 27 | 25 |
| Number of birds died | 5 | 27 | 21 |

The results show that the inoculated group was protected and a high percentage of the birds survived the inoculated challenge.

b. In a further experiment groups of 20 'Sykes Line 50' chickens (day0old) were inoculated with different doses of the attenuated Frant and HPRS 16 viruses. After 20 days the birds together with unvaccinated controls, were challenged intramuscularly with the unattenuated strain of HPRS 16 by using dosage of $10^2$ pfu per bird. All birds were killed after 5 months and subjected to macroscopic examination for lesions.

The results were as follows:

| Group | Inoculated | Control | Control |
|---|---|---|---|
| Number of birds | 27 | 27 | 25 |
| Number of birds died | 5 | 27 | 21 |

| | Frant attenuated strain | | | HPRS 16 attenuated | | |
|---|---|---|---|---|---|---|
| Dose pfu/bird | $9\times10^3$ | $9\times10^2$ | $9\times10$ | $3\times10^2$ | $3\times10$ | Controls |
| Number of birds | 20 | 20 | 20 | 20 | 20 | 20 10 |
| Number of birds with lesions | 2 | 5 | 15 | 5 | 12 | 20 8 | c. in order to find the best possible dosage necessary to protect the birds against natural forms of infection, groups of 20 of the same type of chickens were inoculated with the attenuated Frant Strain at various dosage levels, and challenged by keeping them in contact with a group of other 20 birds previously inoculated with 100 pfu per bird of the unattenuated acute HPRS 16 strain, to provide a source of infection. All birds were killed after 5 months, and the following tabulated results show the incidence of Marek's disease in the relevant groups:

| Dose pfu/bird | $10^3$ | $10^2$ | None Control | Source Birds |
|---|---|---|---|---|
| Number of birds | 20 | 20 | 20 | 20 | 20 |
| Number of birds with lesions | 0 | 2 | 8 | 17 | 20 |

It is clear that a dosage of 1,000 pfu per bird provided adequate protection against infection from other birds in the flock.

Test for stability:

The attenuated Frant Strain was tested for stability by isolating the virus from the blood of one 'Sykes Line 50' chicken inoculated in the tests for absence of pathogenicity, and growing the virus on a Marek's disease free chicken kidney culture. Tissue culture tests showed that the strain had no "A" antigen. 20 'Sykes Line 50' day-old chickens inoculated with the isolated strain remained clinically normal for at least 6 months, which indicated that there was no reversal to the pathogenic form.

Test for oncogenicity:

Hamster cheek pouch tests were carried out according to the recognized method. None of the animals receiving the attenuated strain in association with chicken embryo fibroblast cells showed any symptoms. These results were confirmed in two groups of three new-born hamsters, which showed no clinical symptoms after 8 weeks of treatment.

Tests for spreading:

A group of vaccinated 'Sykes Line 50' birds were left in contact with susceptible birds for 4 months. Both groups were bled fortnightly and their sera tested for antibody and for presence of vaccine virus. At 11 weeks after vaccination all birds were bled and buffy codes of their blood were tested for presence of vaccine virus. The following table shows the results obtained:

| | Vaccinated with $10^5$ pfu/bird | In-contacts |
|---|---|---|
| Number of birds | 5 | 10 |
| Antibody detected | All positive at 10 weeks | None positive at 4 months |
| Virus isolated | 3 | 0 |

Test for protection against different acute virus:

3 Groups of 18 Brown Leghorn Marek's disease free birds were selected. The first group was inoculated with an acute unattenuated 'Frant No. 2' strain isolated under circumstances independent and unrelated to the isolation of the Frant strain hereinbefore described. Each bird received 500 pfu of the 'Frant No. 2' virus, and was used as a contact challenge for susceptible controls (Group 2) and a third group vaccinated with 1,000 pfu per bird of the attenuated Frant strain. The birds were bled at intervals and their sera tested for antibodies to the vaccine and to the challenged 'Frant No. 2' viruses. Eight weeks after the experiment had commenced only two of the vaccinated birds had antibody to the challenged viruses, whereas eight of eleven control birds had such antibody. The experiment has also shown that unattenuated strains would spread freely to any contacts, as expected from experience in the field.

Tests for suitability for use as a vaccine:

Passages of the Frant strain were tested for mycoplasma and were found to be free of such contamination. Field trials were then carried out with a vaccine containing the Frant attenuated strain in a cell-associated form with chicken embryo fibroblast cells, involving several thousand birds. The vaccine (0.2ml, $10^3$ pfu) was injected intramuscularly into the leg of the bird. In each case half of the flock was inoculated with 1,000 pfu intramuscularly. Wherever there was incidence of Marek's disease in uninoculated birds in the flock, those having received the vaccine remained unaffected.

EXAMPLE 3

Experiment with the HPRS 16 Strain:

This strain, after 15 passages according to Example 1, was further passaged 12 times in chicken kidney cells, on Medium No. 1, 12 times in chicken embryo fibroblast cells on Medium No. 3, and 12 times in duck embryo fibroblast cells on Medium No. 3. The strain was then tested in 10 'Sykes Line 50' day-old chickens, which were inoculated with $10^3$ pfu of the strain and later observed clinically for six months. No symptoms appeared and there was a complete absence of lesions when subjecting all birds to a post mortem examination.

EXAMPLE 4

Experiments with the 'Frant No. 2' Strain:

This highly pathogenic strain, called the 'Frant No. 2' strain, was first adapted to chicken kidney cells by three passages in such cultures on Medium No. 3, and was attenuated by a further 15 passages in chicken embryo fibroblast primary cultures using Media Nos. 2 and 3. The strain was shown to have completely lost its "A" antigen, and was apathogenic, immunogenic and safe for use in vaccines according to tests already described.

EXAMPLE 5

The JM strain of Marek's disease virus is attenuated by passage in chick kidney cells (3 passes using Medium No. 1) followed by passage in duck embryo fibroblasts (3 passes) using Medium No. 3. Finally the strain is given from 15 to 18 passes in chick embryo fibroblasts using Medium No. 2. The attenuated strain so obtained is free of the A antigen and is of very high purity. Leucosis agents and other contaminant materials sometimes present in the chick kidneys are removed by selection in the subsequent passes in duck and chick fibroblast cells. The strain is tested according to the procedures given in Example 2 and shown to be highly satisfactory for the purposes of a vaccine.

EXAMPLE 6

The procedure described in Example 5 is followed using strains GA, CAL-1, and CONN-A separately to produce attenuated virus. Each attenuated virus is processed into vaccine form.

EXAMPLE 7

This Example describes the results of several large scale trials made using the vaccine prepared as described in Example 1.

Day-old and three week old chicks were vaccinated by the intra-abdominal (intra-peritoneal) route with a single dose of the vaccine prepared from attenuated strain of HPRS 16. Each chick was given a dose of from 0.2 to 1.0 ml. of the vaccine. The chicks were kept under normal field conditions for a period of 235 days. The incidence of Marek's disease and other nonspecified diseases, particularly coccidiosis, in the vaccinated chicks and in unvaccinated control groups are given in the following tables:

1st Trial:

|  | Day old | 3 weeks old | Unvaccinated |
|---|---|---|---|
| Total number | 1,000 | 1,000 | 2,000 |
| Total mortality | 5  0.05% | 8  0.08% | 42  2.1% |
| Marek's disease mortality | 0  0% | 0  0% | 17  0.85% |
| Non-specified disease mortality | 5  0.05% | 8  0.08% | 25  1.25% |

2nd Trial:

|  | Day old | 3 weeks old | Unvaccinated |
|---|---|---|---|
| Total number | 1,250 | 1,250 | 2,500 |
| Total mortality | 18  1.44% | 19  1.52% | 67  2.68% |
| Marek's disease mortality | 1  0.08% | 1  0.08% | 7  0.28% |
| Non-specified disease mortality | 17  1.36% | 18  1.44% | 60  2.4% |

3rd Trial:

|  | 3 weeks old Vaccinated | Unvaccinated |
|---|---|---|
| Total number | 879 | 2,700 |
| Total mortality 29 | 3.24% | 443  16.4% |
| Marek's disease mortality 9 | 1.03% | 115  4.3% |
| Non-specified disease mortality 20 | 2.21% | 328  12.1% |

4the Trial:

|  | 3 weeks old Vaccinated | Unvaccinated |
|---|---|---|
| Total number | 900 | 6,100 |
| Total mortality 36 | 4% | 1,789  29.3% |
| Marek's disease mortality 12 | 1.33% | 1,076  17.6% |
| Non-specified disease mortality 24 | 2.67% | 713  11.7% |

I claim:

1. Process for the production of attenuated virus of Marek's disease which is a lymphoproliferative disease affecting poultry in which lymphoid tumors of the viscera are common which comprises inoculating in cultured normal or non-tumorous susceptible avian cells initially free of the virus, in presence of cell culture growth medium, a nonattenuated and cell associated Marek's disease virus derived from infected birds encountered in the field, passaging said virus in said susceptible avian cells from one passage level to subsequent passage levels once the cytopathic effort of the virus is developed therein, and continuing said passaging until the virus exhibits that definite degree of attenuation when, as demonstrable by the Ochterlony gel diffusion technique, no A antigen is detectable, and the attenuated virus is free of the A antigen initially present in the non-attenuated from of the virus and is incapable of inducing A antibody when chicks are inoculated therewith and thereafter harvesting said attenuated virus at said or subsequent passage levels at which the attenuated virus is demonstrably capable of solidly protecting inoculated chicks against subsequent virulent virus challenge, said challenge being capable of producing 50 percent mortality in unvaccinated controls.

2. Process according to claim 1 in which said avian cells are chicken cells or duck cells.

3. Process according to claim 2 in which said avian cells are kidney cells.

4. Process according to claim 2 in which said avian cells are fibroblasts.

5. Process according to claim 1 in which the virus is passaged in one species of avian cell susceptible to the virus and then in another species of virus-susceptible avian cell.

6. Process according to claim 5 in which the virus is first passaged in chick embryo kidney cells and subsequently passaged in chick embryo fibroblasts or duck embryo fibroblasts.

7. Process according to claim 6 in which the number of passages in the fibroblasts exceeds that in the kidney cells.

8. Process according to claim 7 in which the number of passages in kidney cells is from 1 to 6.

9. Process according to claim 1 in which the total number of passages is at least 20.

10. Process according to claim 1 in which the number of passages is at least 25.

11. Process according to claim 1 in which the number of passages is from 31 to 39.

12. A live vaccine protective against Marek's disease comprising as an antigenic component an effective protective amount of plaque-forming units per unit dose of an attenuated form of the virus of Marek's disease substantially free of the A antigen, produced by the process of claim 1 or by further multiplication thereof.

13. A vaccine according to claim 12 containing from about $5 \times 10^2$ to about $7 \times 10^3$ plaque-forming units per unit dose.

14. A method of protecting poultry against Marek's disease which comprises inoculating the chick embryo or the young chick with an effective protective unit dose of a live virus vaccine substantially free of A antigen as defined in claim 12.

15. A method according to claim 14 in which the effective protective unit dose of live virus vaccine substantially free of A antigen is given by subcutaneous, intramuscular, intranasal or intraocular injection.

16. A method according to claim 14 in which the live virus vaccine is injected into the leg of the chick.

17. A method according to claim 14 in which the live virus vaccine is given by intra-abdominal injection.

* * * * *